United States Patent
Warner

[11] Patent Number: 5,293,093
[45] Date of Patent: Mar. 8, 1994

[54] LIMITED LARGE ANGLE ROTARY DYNAMOELECTRIC MACHINE

[75] Inventor: Stephen B. Warner, Evanston, Ill.

[73] Assignee: MPC Products Corporation, Skokie, Ill.

[21] Appl. No.: 797,576

[22] Filed: Nov. 25, 1991

[51] Int. Cl.$^5$ ............................................. H02K 1/12
[52] U.S. Cl. ................................... 310/254; 310/156; 310/164; 310/179; 310/216
[58] Field of Search ........................ 310/36-39, 310/156, 179, 180, 176, 164, 251, 254, 259, 71, 216, 68 R; 335/222, 227

[56] References Cited

U.S. PATENT DOCUMENTS

| | | | |
|---|---|---|---|
| 1,920,354 | 8/1933 | Carpenter | 310/217 U X |
| 2,149,634 | 3/1939 | Schweitzer, Jr. | 310/216 U X |
| 3,028,511 | 3/1962 | Beyner | 310/156 |
| 3,344,325 | 9/1967 | Sklaroff | 310/156 |
| 3,708,706 | 1/1973 | Akiyama | 310/216 |
| 3,891,905 | 6/1975 | Muller . | |
| 4,011,475 | 3/1977 | Schmider . | |
| 4,322,666 | 3/1982 | Muller . | |
| 4,547,713 | 10/1985 | Langley | 310/254 |
| 4,642,539 | 2/1987 | Hinds . | |
| 4,645,961 | 1/1987 | Malsky . | |
| 4,707,645 | 11/1987 | Miyao et al. . | |
| 4,724,368 | 2/1988 | Andrews . | |
| 4,769,567 | 9/1988 | Kurauchi et al. . | |
| 4,777,394 | 10/1988 | Hayashi | 310/216 |
| 4,918,346 | 4/1990 | Tajima et al. . | |
| 5,015,901 | 5/1991 | Phelon | 310/156 |
| 5,086,245 | 2/1992 | Sieja | 310/216 |

OTHER PUBLICATIONS

BEI Motion Systems company, Kimco Magnetics Division, "Linear and Rotary Actuators," Jul., 1990.
Vernitron Controls, "Vernitorq Brushless Limited Angle Torque Motors," No. V-201 5M188 (No Date).
Aeroflex Laboratories Incorporated, "Brushless Wide Angle DC Tachometers"(No Date).
Aeroflex Laboratories Incorporated, "Brushless Dc Torque Motors from Aeroflex," No. VL75K972 (No Date).

*Primary Examiner*—R. Skudy
*Attorney, Agent, or Firm*—McDermott, Will & Emery

[57] ABSTRACT

A limited large angle dynamoelectric machine generates a constant torque over an arc greater than 180 degrees without discontinuity and zero cogging. At any given location of the rotor, the flux path of the machine only crosses the stator coil at a single location. This results in the elimination of any type of commutation of the stator coil.

23 Claims, 4 Drawing Sheets

PRIOR ART

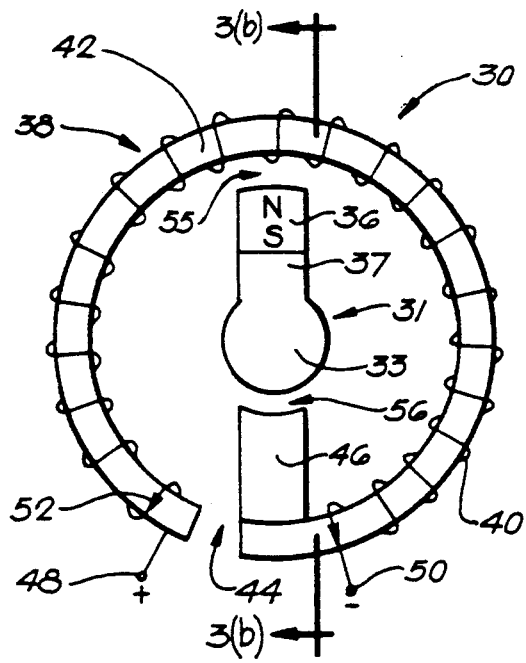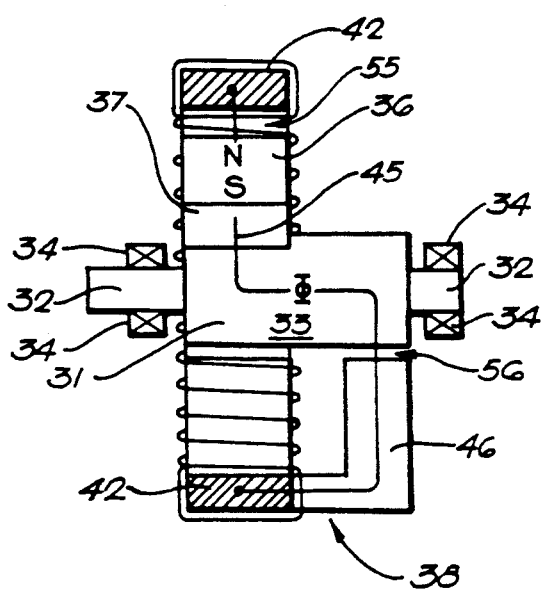
FIG. 3(a)  FIG. 3(b)
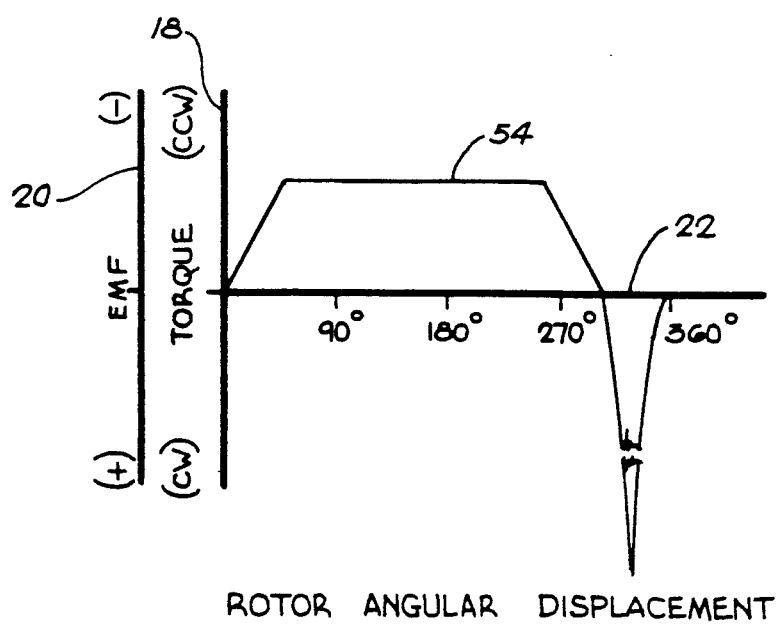
FIG. 4

LIMITED LARGE ANGLE ROTARY DYNAMOELECTRIC MACHINE

BACKGROUND OF THE INVENTION

The present invention relates to dynamoelectric machines, particularly dynamoelectric machines free of ripple and other discontinuities over a limited arc range up to and greater than 180 mechanical degrees.

In the industry of high performance position control there is a need for rotating electromagnetic components which produce essentially ideal performance over a limited angular excursion. FIG. 1 shows a prior art dynamoelectric device 10 commonly known as a toroidally wound, limited angle device. It includes a permanently magnetized rotor 12 having a north pole N and a south pole S. Rotor 12 is surrounded by a highly magnetically permeable stator core 14 (typically soft iron) on which is wound a coil 16 of matching polarity as that of the rotor 12. The principle of operation of these devices is well known in the art. An air gap is present between the stator core 14, which forms the flux return path, and the polarized ends N, S of the rotor 12. A high flux density (B) is established in this gap that "cuts" the turns 16 of the winding. Fundamental equations describing the produced torque and voltage are as follows:

$$Torque = N(I \times B)l$$

$$Voltage = NBlv$$

where:

I is the current (in Amps) flowing through the coil 16.

l is the mutual length of rotor 12 and stator 14 (into the page).

v is the velocity of the rotor 12.

B is the flux density in the vicinity of the windings (air gap)

N is the number of series wound turns 16 "cut" by the flux (B) in the vicinity of the turns 16 in the air gap between the turns 16 and the polarized ends N, S of the rotor 12.

X designates the vector cross product.

FIG. 2 graphically shows the typical performance of dynamoelectric device 10. Axis 18 represents torque produced when the dynamoelectric device 10 is operated as a motor and axis 20 represents voltage, or Emf (electromotive force), produced when the dynamoelectric device 10 is operated as a tachogenerator. Axis 22 represents angular displacement of rotor 12 in degrees, with zero degrees being where the north pole of rotor 12 of FIG. 1 is at its furthest left-hand point (nine o'clock position). A distinct characteristic of dynamoelectric device 10 is its relatively trapezoidal Emf/Torque profile. Since device 10 has 2 poles, the waveform 24 inverts polarity at two places, 180 degrees apart. Because magnetic poles are always found in pairs, north and south, it has been difficult to extend the range of constant torque beyond 180 degrees.

SUMMARY OF THE INVENTION

An object of the present invention is to provide a large angle, constant torque dynamoelectric machine.

Still another object of the present invention is to provide a dynamoelectric machine wherein the flux path of the machine only crosses a stator coil once.

A further object of the present invention is to provide a large angle, constant voltage dynamoelectric machine.

Still a further object of the present invention is to provide a dynamoelectric machine free of ripple.

An additional object of the present invention is to provide a dynamoelectric machine free of cogging.

Another object of the present invention is to provide a dynamoelectric machine free of discontinuities.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 3(a) is a plane view of an embodiment of the present invention;

FIG. 3(b) is a side sectional view of the device shown in FIG. 3(a) taken along line 3(b)—3(b) of FIG. 3(a);

FIG. 4 shows graphically the Emf v. Rotor Angular Displacement and Torque v. Rotor Angular Displacement characteristics of the dynamoelectric device shown in FIGS. 3(a) and 3(b);

DETAILED DESCRIPTION OF THE PREFERRED EMBODIMENTS

Figure 1:
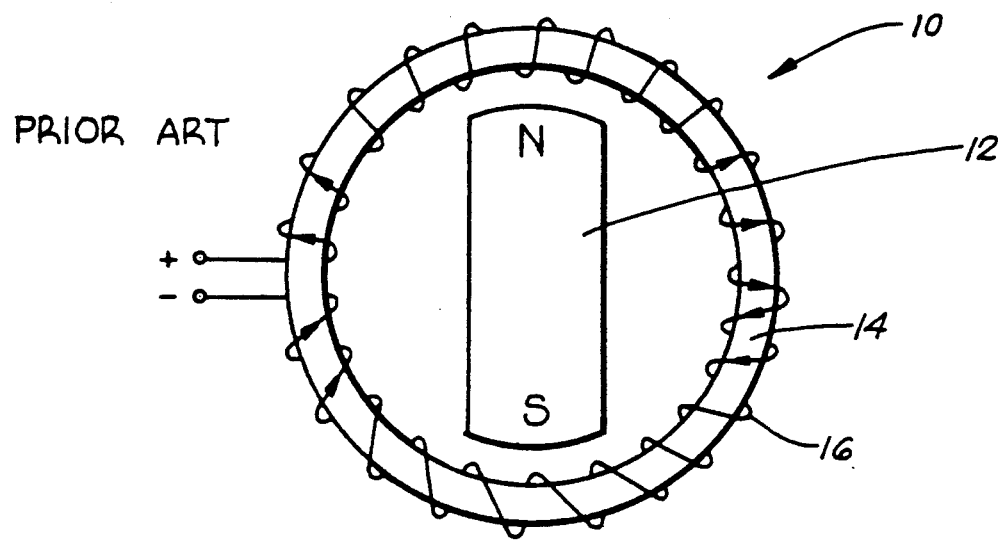
FIG. 1 shows a schematic representation of a prior art dynamoelectric device.

FIGS. 3(a) and 3(b) show one embodiment of the present invention. Dynamoelectric machine 30 includes a rotor 31, a stator 38 surrounding the rotor 31, and a coil 40 wound about the stator 38. Rotor 31 includes a generally cylindrical member 33 with axial shafts 32 on either end of the cylinder 33 which are received by bearings 34 such that the rotor 31 is freely rotatable thereon. Rotor 31 also includes a permanent magnet 36 extending from the rotor cylinder 33 via lobe 37. Magnet 36 has a north pole N and a south pole S. The rotor 31 may be constructed as a single integral unit. However, it is also possible to construct the rotor 31 as separate parts attached together by adhesive in order to make use of high energy permanent magnet materials which are restricted to simpler shapes.

Stator 38 is preferably made of soft iron and includes a broken toroid 42 defining an air gap 44 and an L-extension 46 extending from the broken toroid 42, preferably at a point adjacent to air gap 44. L-extension 46 extends a sufficient distance from the broken toroid 42 to allow the magnet 36 and lobe 37 to rotate about the area defined within the broken toroid 42. Preferably the stator 38 is formed as a single integral unit. However, it is also possible to construct the stator 38 as separate parts attached together by fasteners, cement or welding.

Coil 40 is helically wound about the broken toroid 42 of the stator 38, and is constructed of wire having a gauge suitable for the particular application for which the dynamoelectric machine is to be used, a determination well known to those of ordinary skill in the art. The size and number of turns of coil 40 wound about the stator 38 also depend on the application and can be determined by a method well known to those of ordinary skill in the art. In one embodiment, 35 gauge wire was used to wind approximately 2300 turns about a broken toroid having an internal diameter of approximately 1.5 inches.

Coil 40 has two termination points 48, 50 to which a D.C. power source (not shown) is connected with the polarity shown in FIG. 3(a). The voltage of the D.C. power source in one preferred embodiment was 25 volts. However, the voltage appropriate for the particular application for which the dynamoelectric machine 30 is used can be determined by a method well-known to those of ordinary skill in the art. Arrow 52 indicates the direction of current flow through the coil 40 when the D.C. power source is connected to terminals 48 and 50 with the polarity shown in FIG. 3(a).

When dynamoelectric machine 30 is operated as a motor, a D.C. power source is connected to terminals 48 and 50 with the polarity as shown in FIG. 3(a), the rotor 31 will rotate in a clockwise direction when viewed from the same angle as shown in FIG. 3(a). It should be understood that reversing the polarity of the D.C. source applied to terminals 48 and 50 will reverse the direction of rotation of the rotor 31. As is well known to those of ordinary skill in the art, the actual speed and torque achieved by the rotor 31 as it rotates depends on several variables, including the D.C. voltage applied to terminals 48 and 50, the number of turns of coil 40, and the strength of the magnet 36. In relative terms, however, the Torque v. Rotor Angular Displacement waveform of dynamoelectric machine 30, when operated as a motor, has the general characteristics of the waveform 54 shown in FIG. 4, where axis 18 represents torque produced when the dynamoelectric machine 30 is operated as a motor, axis 20 represents voltage, or Emf, produced when the dynamoelectric machine 30 is operated as a tachogenerator, and axis 22 represents angular displacement of rotor 31 in degrees, with zero degrees being where the north pole of magnet 36 is opposite stator 42 at the point just to the left of air gap 44 as shown in FIG. 3(a) (approximately, seven o'clock position).

In the graph of FIG. 4, 0 degrees is defined as that point where the north pole N of magnet 36 is opposite that portion of the broken toroid 42 adjacent to air gap 44, on the clockwise side thereof. As can be discerned from FIG. 4, when the rotor 31 begins to rotate, the torque increases in a generally linear fashion until a maximum torque is reached at approximately 45 degrees. The torque then remains constant up to approximately 315 degrees at which point the north pole N of magnet 36 starts to pass the last turn of coil 40 before air gap 44 on the counterclockwise side thereof. At that point the torque decreases in approximately a linear fashion until the north pole N of magnet 36 has completed passed that last turn of coil 40. The rest of the curve reflects a negative torque spike which would occur if the rotor 31 is displaced by external forces so as to traverse air gap 44. It should be noted that at any point along the waveform 54, if the D.C. power source is interrupted, the torque will become negligible, because of the nearly constant reluctance of the surrounding magnetic circuit.

Figure 2:
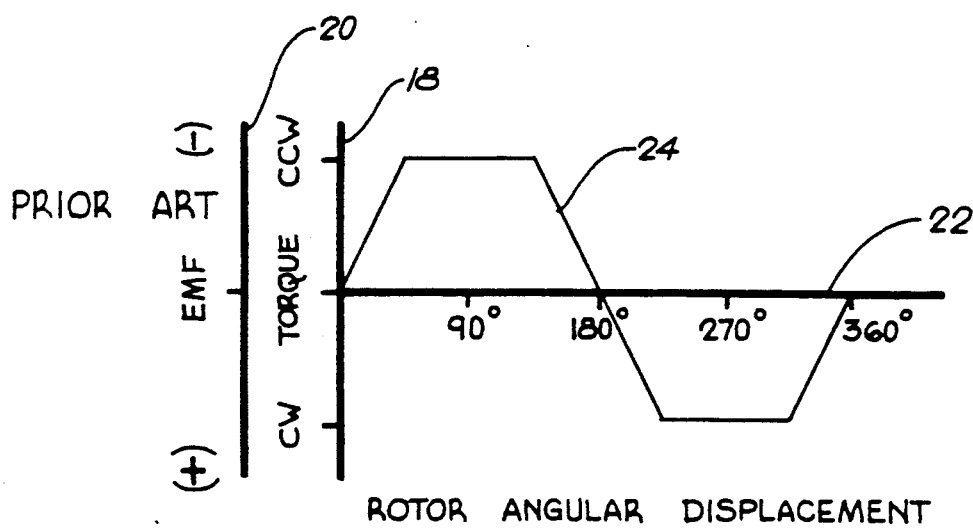
FIG. 2 shows graphically the Emf v. Rotor Angular Displacement and Torque v. Rotor Angular Displacement characteristics of the prior art device shown in FIG. 1.

It is theorized that the rotor 31 is allowed to rotate over such a large arc at a constant torque because a single rotor polarity (the north pole N of magnet 36) is always present in the vicinity of coil 40, which is also of only one polarity. As shown in FIG. 3(b), magnetic flux $\phi$ (PHI) is supplied by the magnet 36. The magnetic flux $\phi$ (PHI) crosses air gap 55 and some of the turns of coil 40 and then enters the broken toroid 42. The flux $\phi$ (PHI) then follows the path established by the broken toroid 42 to L-extension 46 and across air gap 56 to cylinder 33. The flux $\phi$ (PHI) is carried axially through the cylinder 33 and lobe 37 and returns to the south pole S of the magnet 36 to complete the magnetic circuit. Establishing a flux path 45 like that shown in FIG. 3(b) prevents the inversion shown in FIG. 2 found in prior art devices like that shown in FIG. 1, which is due to having both poles of the magnet of the rotor passing the turns of the coil. Consequently, wherein a device like that shown in FIG. 1 is limited to a constant torque range of less than 180 degrees, the device shown in FIGS. 3(a) and 3(b) provides constant torque over a range significantly greater than 180 degrees.

By increasing the range of constant torque, the dynamoelectric machine 30 provides a more ideal means of precisely rotating a load through large angle excursions. This is particularly useful in fine resolution instruments and other applications where precise positioning is critical.

When operated as a tachogenerator, the dynamoelectric machine 30 produces an Emf across terminals 48 and 50 when rotor 31 is rotated. The graph shown in FIG. 4 also shows the characteristics of the Emf waveform produced when rotor 31 is rotated in a clockwise direction at a constant speed. It should be noted that the polarity of the Emf generated at terminals 48 and 50 will be reversed if the rotation of rotor 31 is reversed. In addition, as is well known to those of ordinary skill in the art, the magnitude of the Emf generated depends on various factors, including the speed of the rotation of rotor 31, the number of turns of coil 40, and the strength of the magnet 36.

Figure 5A:
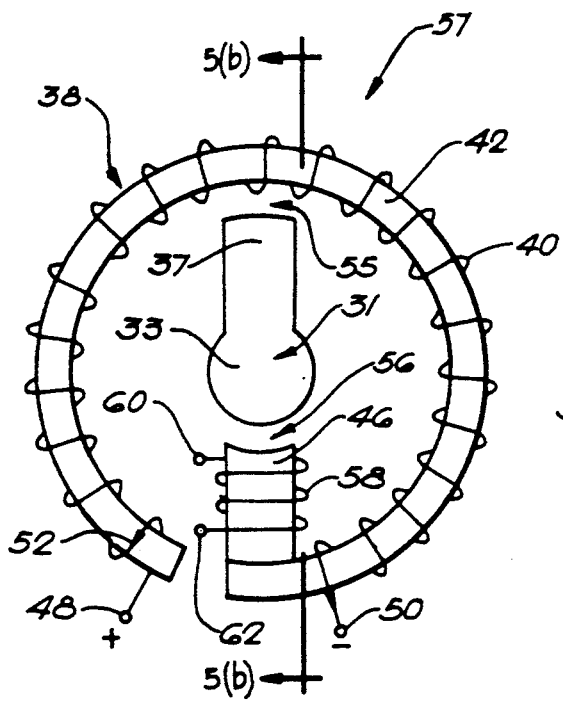
FIG. 5(a) is a plane view of another embodiment of the present invention utilizing an electrically produced, magnetic rotor field produced in the stator.
Figure 5B:
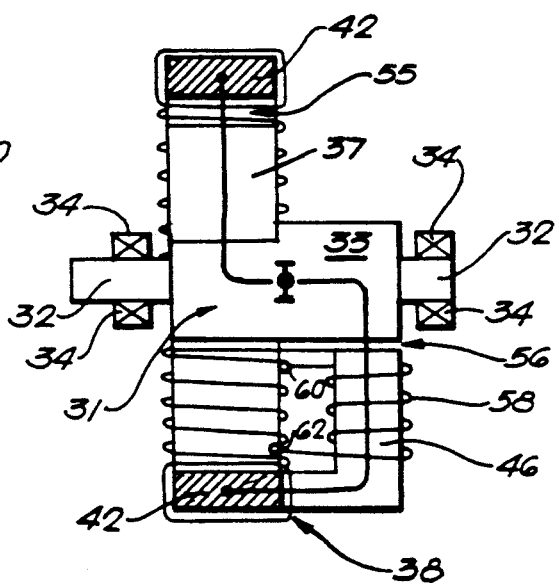
FIG. 5(b) is a side sectional view of the device shown in FIG. 5(a) taken along line 5(b)—5(b) of FIG. 5(a)

Turning now to the embodiment of the invention shown in FIGS. 5(a) and (b), where like numbers refer to like items, a variable transformer 57, useful as a position transducer, is shown. Rotor 31 includes a generally cylindrical member 33 and a lobe 37, both preferably made of soft iron and formed as a single integral unit. Unlike the embodiment shown in FIGS. 3(a) and (b), a magnet is not attached to lobe 37. Coil 58 is helically wound about the longer section of L-extension 46 and terminates in two ends, 60 and 62.

Figure 6:
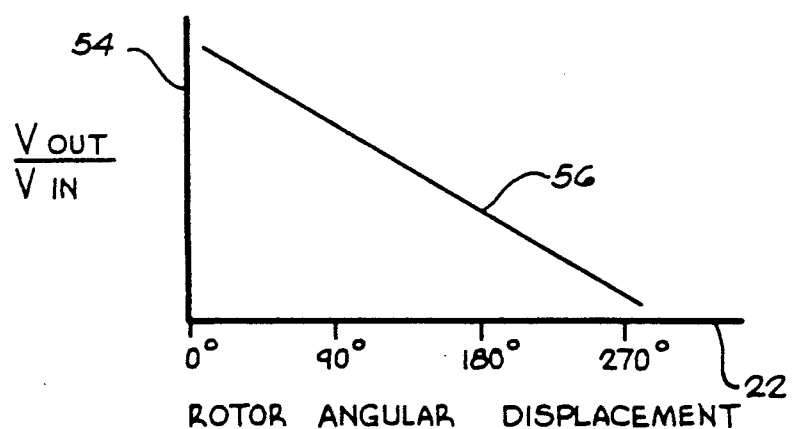
FIG. 6 shows graphically the $V_{OUT}/V_{IN}$ v. Rotor Angular Displacement characteristics of the dynamoelectric device shown in FIGS. 5(a) and 5(b) when it is supplied with an alternating current field and is used as a position transducer.

In operation, coil 58 acts as a primary coil and is excited with an A.C. source connected to terminals 60 and 62. Coil 40 acts as a secondary coil and produces a voltage at terminals 48 and 50 which is approximately linearly proportional to the source connected to coil 58 based on the position of rotor 31. FIG. 6 illustrates graphically the relationship of $V_{OUT}/V_{IN}$ to Rotor Angular Displacement, where $V_{OUT}$ is the voltage produced at terminals 48 and 50 and $V_{IN}$ is the voltage of the source connected to terminals 60 and 62. As can be seen from FIG. 6, the exact angular position of rotor 31 over the range 0 degrees to greater than 270 degrees can be determined by monitoring the value of $V_{OUT}/V_{IN}$.

Figure 7B:
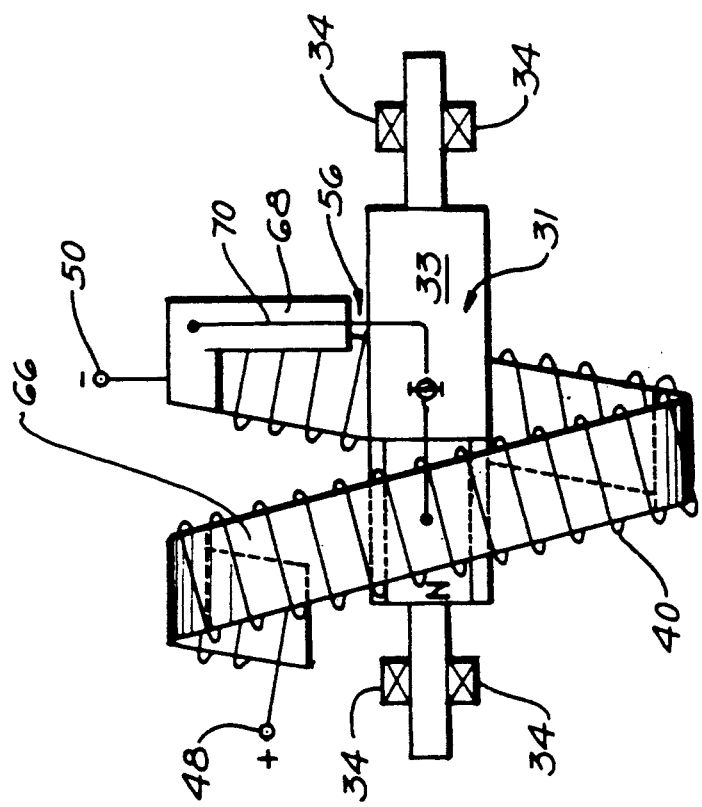
FIG. 7(b) is a side view of the device shown in FIG. 7(a)
Figure 7A:
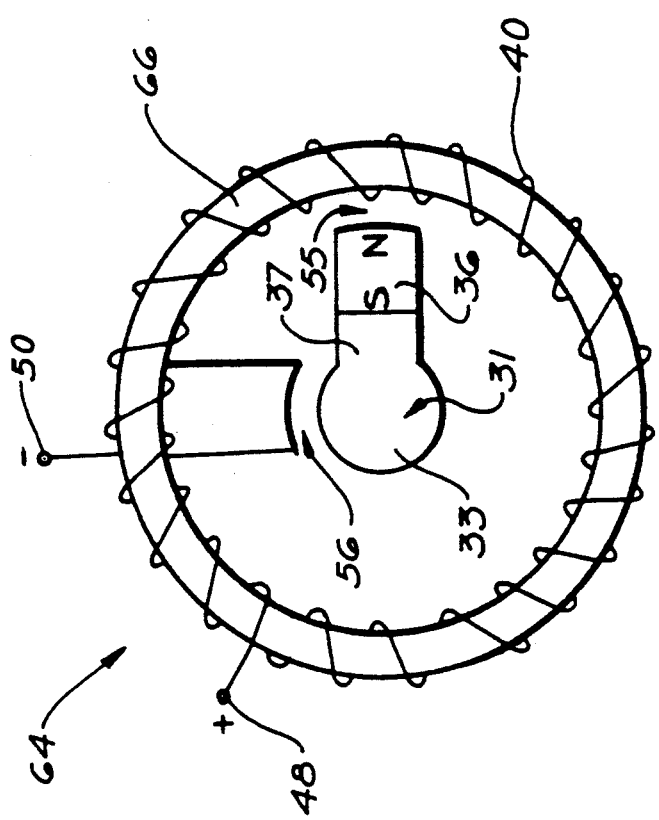
FIG. 7(a) is a plane view of still another embodiment of the present invention where the stator is in the form of a helix.

In FIGS. 7(a) and (b), where like numbers refer to like items, another embodiment of the present invention is shown wherein dynamoelectric machine 64 includes a helical stator 66 having an L-shaped extension 68 which is preferably integral with stator 66. A portion of north pole N is always passing by a portion of coil 40 at all times as the rotor 31 rotates. The helical stator 66 and As shown in FIG. 7(b), the flux path 70 only crosses coil 40 at the point where north pole N passes the coil 40. The dynamoelectric machine 64 provides constant torque (or Emf) throughout an entire revolution of rotor 31. In addition, when operated as a position transducer in a manner as described previously for the embodiment shown in FIGS. 5(a) and (b), the position of the rotor 31 can be determined anywhere along its circular path.

While various forms and modifications have been described above and illustrated in the drawings, it will be appreciated that the invention is not limited thereto but encompasses all variations and expedients within the scope of the following claims.

I claim:

1. A dynamoelectric machine comprising:
   a stator including a broken toroid defining a first air gap and an L-shaped extension attached to said stator at a point of said stator adjacent to said first air gap, said broken toroid defining a cylindrical area;
   a first wire coil wound helically about said broken toroid, said first wire coil defining first and second terminals;
   a rotor including a generally cylindrical portion and a magnetized portion, said magnetized portion located at least partially within said cylindrical area defined by said broken toroid; and
   said rotor and said L-shaped extension defining a second air gap.

2. The dynamoelectric machine of claim 1 wherein an Emf is generated across said first and second terminals when said rotor is rotated.

3. The dynamoelectric machine of claim 1 wherein said rotor rotates when a D.C. source is connected across said first and second terminals.

4. The dynamoelectric machine of claim 1 wherein said magnetized portion of said rotor includes a permanent magnet.

5. A dynamoelectric machine comprising:
   a stator including a broken toroid defining a first air gap and an L-shaped extension attached to said stator at a point of said stator adjacent to said first air gap, said broken toroid defining a cylindrical area;
   a first wire coil helically wound about said broken toroid, said first wire coil defining first and second terminals;
   a rotor including a generally cylindrical portion and an extension, said extension located at least partially within said cylindrical area defined by said broken toroid; and
   said rotor and said L-shaped extension defining a second air gap.

6. The dynamoelectric machine of claim 1 further including a second wire coil helically wound about at least a portion of said L-shaped extension, said second wire coil defining third and fourth terminals.

7. The dynamoelectric machine of claim 6 wherein said third and fourth terminals are connected to an A.C. source and wherein an A.C. signal is produced across said first and second terminals having an amplitude proportional to the rotational position of said rotor.

8. A dynamoelectric machine comprising:
   a helically-shaped stator including a generally L-shaped extension, said stator defining a cylindrical area within said helically-shaped stator;
   a wire coil wound about said helically-shaped stator, said wire coil defining first and second terminals;
   a rotor including a generally cylindrical portion and a second extension, said second extension located at least partially within said cylindrical area;
   said rotor and said L-shaped extension defining a first air gap; and
   said second extension and said stator defining a second air gap.

9. The dynamoelectric machine of claim 8 wherein said second extension includes a magnetized portion.

10. The dynamoelectric machine of claim 9 wherein said magnetized portion of said second extension includes a permanent magnet.

11. The dynamoelectric machine of claim 8 wherein an Emf is generated across said first and second terminals when said rotor is rotated.

12. The dynamoelectric machine of claim 8 wherein said rotor rotates when a D.C. source is connected across said first and second terminals.

13. The dynamoelectric machine of claim 8 further including a second wire coil helically wound about at least a portion of said L-shaped extension, said second wire coil defining third and fourth terminals.

14. The dynamoelectric machine of claim 13 wherein said third and fourth terminals are connected to an A.C. source and wherein an A.C. signal is produced across said first and second terminals having an amplitude proportional to the rotational position of said rotor.

15. A dynamoelectric machine comprising:
   a helically shaped stator defining an interior area;
   a first wire coil helically wound about said stator, said first wire coil defining first and second terminals;
   a rotor located at least partially within said interior area defined by said helically shaped stator;
   said rotor adapted to rotate about a rotational axis intersecting said interior area defined by said stator; and means for substantially reducing ripple of said machine over an arc range greater than 180 mechanical degrees, including
   means for establishing a magnetic flux path passing through said stator, said rotor and said first wire coil, wherein said magnetic flux path traverses a portion of said rotor along an axis generally parallel to said rotational axis.

16. The dynamoelectric machine of claim 15 wherein said rotor includes a first extension.

17. The dynamoelectric machine of claim 16 wherein said first extension includes a magnetized portion.

18. The dynamoelectric machine of claim 17 wherein said magnetized portion of said first extension includes a permanent magnet.

19. The dynamoelectric machine of claim 16 wherein said stator includes a second extension, and wherein said second extension and said rotor define an air gap.

20. The dynamoelectric machine of claim 19 further including a second wire coil helically wound about at least a portion of said second extension, said second wire coil defining third and fourth terminals.

21. The dynamoelectric machine of claim 20 wherein said third and fourth terminals are connected to an A.C. source and wherein an A.C. signal is produced across said first and second terminals having an amplitude proportional to the rotational position of said rotor.

22. The dynamoelectric machine of claim 15 wherein an Emf is generated across said first and second terminals when said rotor is rotated.

23. The dynamoelectric machine of claim 15 wherein said rotor rotates when a D.C. source is connected across said first and second terminals.

* * * * *